United States Patent
Corbett et al.

(10) Patent No.: US 6,698,484 B1
(45) Date of Patent: *Mar. 2, 2004

(54) METHOD FOR REDUCING CORE CRUSH

(75) Inventors: Darrell H. Corbett, Maple Valley, WA (US); Stuart A. Smith, Kent, WA (US)

(73) Assignee: The Boeing Company, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/164,792

(22) Filed: Oct. 1, 1998

Related U.S. Application Data

(62) Division of application No. 08/616,903, filed on Mar. 15, 1996, now Pat. No. 5,895,699.

(51) Int. Cl.[7] ............................................. B32B 31/00
(52) U.S. Cl. .................... 156/382; 156/285; 156/286; 156/87; 156/90
(58) Field of Search .................................. 156/285, 286, 156/382, 87, 90; 428/116

(56) References Cited

U.S. PATENT DOCUMENTS 4,937,125 A * 6/1990 Sanmartin et al. ........... 428/116
5,685,940 A * 11/1997 Hopkins et al. ............. 156/291

* cited by examiner

*Primary Examiner*—Deborah Jones
*Assistant Examiner*—Wendy Boss
(74) *Attorney, Agent, or Firm*—John C. Hammar

(57) ABSTRACT

We reduce core crush in honeycomb sandwich structure by using a peripheral tiedown ply, generally in combination with a scrim-reinforced barrier film, between the composite laminate and the core along the panel chamfer to prevent slipping of the barrier film and outer laminates relative to the core during curing. We produce superior panels with lighter weights, improved mechanical properties, and more predictable structural performance.

3 Claims, 3 Drawing Sheets

METHOD FOR REDUCING CORE CRUSH

REFERENCE TO RELATED APPLICATION

The present invention is a divisional application based upon U.S. patent application Ser. No. 08,616,903, filed Mar. 15, 1996, now U.S. Pat. No. 5,895,699.

NOTICE OF GOVERNMENT RIGHTS

The present invention was made during performance of Contract No. F33657-91-C-0006 awarded by the Air Force. The Government has certain rights in the invention.

TECHNICAL FIELD

The present invention relates to composite honeycomb sandwich structure having improved resistance to core crush. In a preferred embodiment, we adhere resin impregnated fabric sheets forming outer, opposed, skin surfaces to a chamfered honeycomb core, optionally, with an intermediate barrier film to eliminate resin flow from the skins to the core. We interleave a peripheral tiedown ply between the core and skins along the chamfer to reduce core crush.

BACKGROUND ART

Aerospace honeycomb core sandwich panels (having composite laminate skins cocured with adhesives to the core through autoclave processing) find widespread use today because of the high stiffness-to-weight (i.e., "specific stiffness) and strength-to-weight (i.e., specific strength) ratios the panels afford. Typical honeycomb core sandwich panels are described in U.S. Pat. Nos. 5,284,702; 4,622,091; and 4,353,947, which we incorporate by reference. Altenender et al., *Processing and Characterization Studies of Honeycomb Composite Structures*, 38th Int'l SAMPE Symposium, May 10–13, 1993 (PCL Internal No. 200-01/93-AWA) discusses common problems with these panels, including core collapse (i.e., core crush), skin laminate porosity, and poor tool surface finish. We incorporate this article by reference.

As Hartz et al. described in U.S. Pat. No. 5,604,010 entitled "Composite Honeycomb Sandwich Structure," with a high flow resin system, large amounts of resin can flow into the core during the autoclave processing cycle. Such flow robs resin from the laminate, introduces a weight penalty in the panel to achieve the desired performance, and forces over design of the laminate plies to account for the flow losses. The resin loss from the laminate plies also reduces the thickness of the cured plies which compromises the mechanical performance. To achieve the desired performance and the corresponding laminate thickness, additional plies are necessary with resulting cost and weight penalties. Because the weight penalty is severe in terms of the impact on vehicle performance and cost in modern aircraft and because the flow is a relatively unpredictable and uncontrolled process, aerospace design and manufacture dictates that flow into the core be eliminated or significantly reduced. In addition to the weight penalty from resin flow to the core, we discovered that microcracking that originated in the migrated resin could propagate to the bond line and degrade mechanical performance. Such microcracking potential poses a catastrophic threat to the integrity of the panel and dictates that flow be eliminated or, at least, controlled.

Flow from the laminates to the core occurs because of viscosity reduction of the resin (i.e., thinning) at the elevated processing temperatures. Therefore, prior art attempts to solve the flow problem have generally focused on retaining the ambient temperature viscosity of the resin at the curing temperatures. For example, one might alter the processing cycle to initiate curing of the resin during a slow heat-up, low pressure step to induce resin chain growth before high temperature, high pressure completion. In this staged cure cycle, one would try to retain the resin's viscosity by building molecular weight at low temperatures. Higher molecular weight resins have inherently higher viscosity so they remain thicker and are resistant to damaging flow to the core. Unfortunately, with a staged cure cycle, too much flow still occurs, and the potential problems of microcracking still abound. Also, facesheet porosity might increase beyond acceptable limits. Furthermore, a modified cure cycle increases autoclave processing time. Increased processing time translates to a significant fabrication cost increase with risk of rejection of high value parts at the mercy of uncontrolled and inadequately understood factors. We incorporate the Hartz et al. Patent by reference.

U.S. Pat. No. 5,445,861 describes composite sandwich structure for sound absorption (acoustic insulation) and other applications. The sandwich structures have seven layers as follows:

(1) an outer skin;
(2) a small celled honeycomb or foam core;
(3) a frontside inner septum;
(4) a large celled middle honeycomb core;
(5) a backside, inner septum;
(6) a backside, small celled honeycomb or foam core; and
(7) an inner skin.

Tuned cavity absorbers in the middle honeycomb core absorb sound. Performance of this structure suffers from resin flow to the cells of the honeycomb cores during fabrication for the reasons already discussed and because such flow alters the resonance of the structure. We incorporate this patent by reference.

The Hartz et al. process of eliminates resin (matrix) flow into the honeycomb core for sandwich structure using high flow resin systems and results in reproducibility and predictability in sandwich panel fabrication and confidence in the structural performance of the resulting panel. Hartz et al. use a scrim-supported barrier film between the fiber-reinforced resin composite laminates and the honeycomb core. This sandwich structure is lighter for the same performance characteristics than prior art panels because the resin remains in the laminate (skin) where it provides structural strength rather than flowing to the core where it is worthless, introducing excess weight and potential panel failure. Hartz et al. also generally use an unsupported film adhesive between the barrier film and the laminates to bond the laminates to the barrier film. With these layers (which might be combined into one product), they achieved improved performance, retained the resin in the laminates and thereby reduced excess resin that designers otherwise needed to design into the panels to account for resin flow into the core, and reliably fabricated panels in which they had structural confidence.

We discovered that core crush frequently occurred in the chamfer region of honeycomb core when we cured a panel having a scrim-supported barrier film, particularly when we tried to use lighter weight core materials. We subsequently discovered that we could reduce core crush in these panels by including a tiedown ply in contact with the core beneath the barrier film (and adhesive) because the tiedown ply reduced slippage of the barrier film relative to the core during curing.

SUMMARY OF THE INVENTION

Our invention relates to a method for reducing core crush in composite honeycomb sandwich structure, especially panels of the general type Hartz et al. described. We incorporate one or more tiedown plys in contact with the core in its chamfer regions around the periphery to eliminate slippage of the skin over the core during autoclave curing, and, thereby, to eliminate core crush that results from the movement.

Our invention also relates to the resulting composite honeycomb sandwich structure. There, we usually minimize the weight by trimming the internal area of the tiedown ply(s) so that it frames and slightly overlaps the chamfer of the underlying core. By controlling core slippage, we are able to use the lighter density honeycomb core to produce structures without costly scrap due to core crush. We reduce manufacturing costs both by saving time, materials, and rework/scrap and by improving the reliability of the manufacturing process to produce aerospace-quality panels having the highest specific strength and specific stiffness.

The tiedown ply also provides a path for egress of volatiles from the core and to equalize the pressure which permits us to maintain the correct pressures within the core to further reduce core crush.

DETAILED DESCRIPTION OF A PREFERRED EMBODIMENT

Before discussing our method to eliminate core crush, we will initially describe typical composite honeycomb sandwich structure.

Figure 1:
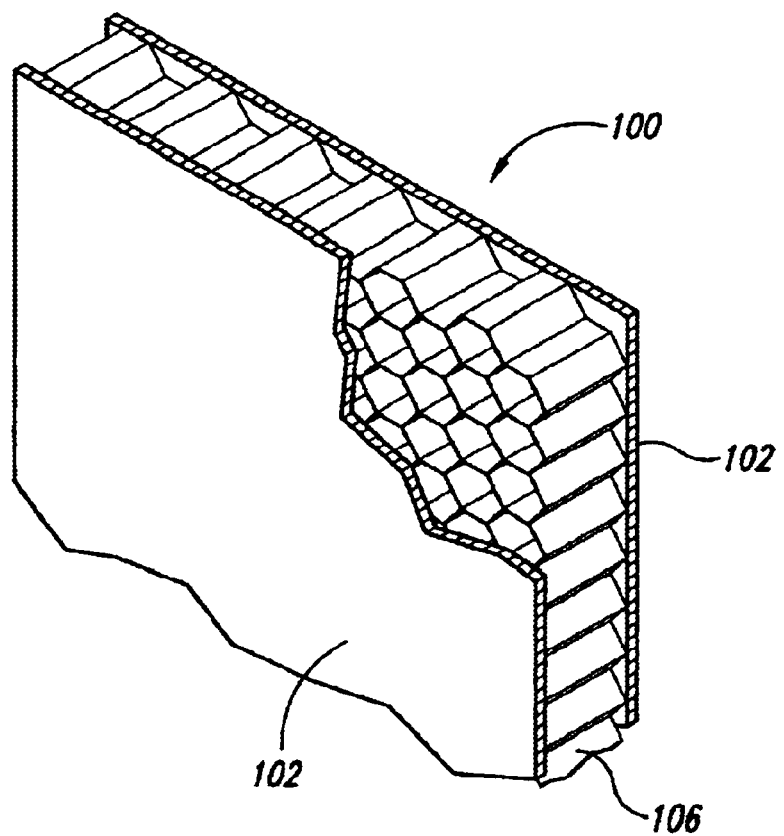
FIG. 1 illustrates a typical composite honeycomb sandwich structure.

A Hartz-type composite honeycomb sandwich panel of U.S. Pat. No. 5,604,010 minimizes, eliminates, or significantly reduces resin flow from the laminates to the core, thereby permitting a simpler processing cycle that is more robust for the manufacture of aerospace structure. Such a sandwich panel 100 (FIG. 1) generally has outer facesheets or skins 102 adhered to a central honeycomb core 106. The finished skins 102 comprise laminates of layers of fiber-reinforced organic matrix resin in a cured and consolidated composite form. The core 106 can be paper, synthetic paper, metal, composite, or the like, as appropriate for the application. In panels of the present invention, we obtain higher specific strengths and higher specific stiffnesses because we reduce core crush during autoclave curing by incorporating at least one tiedown ply between the core 106 and skin 102 to reduce damaging slippage between the core and skin that otherwise often occurs.

To prevent flow of resin from the composite laminate skin to the core, Hartz et al. use an unsupported film adhesive 108 (FIG. 2), a barrier film 110, and a scrim-supported film adhesive 112 between the skin 102 and the core 106 to keep resin out of the cells 114 of the core 106.

Figure 3:
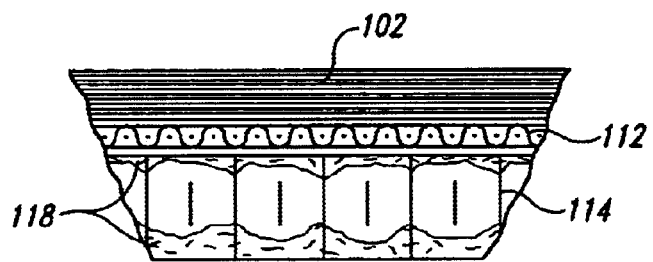
FIG. 3 is a schematic, partial sectional view of prior art honeycomb sandwich structure, suffering resin flow to the core, using a supported film adhesive without a barrier film.

FIG. 3 illustrates the core-filling problems that can result when a film adhesive 112 is used alone without the barrier film 110 and film adhesive 108. Cells 114 of the honeycomb fill with resin 118 which migrates from the laminates and which thereby depletes the resin in the skin 102. Resin depletion impacts structural performance because it reduces ply thickness. Resin depletion increases total weight since the cell resin 118 is simply waste. In all cases, uncontrolled resin flow and depletion makes the panel suspect, especially to microcracking that can begin in the cell resin 118 during thermal cycling and migrate to the fiber-reinforced skin 102, especially at the bond line between the skin 102 and core 106.

Figure 4:
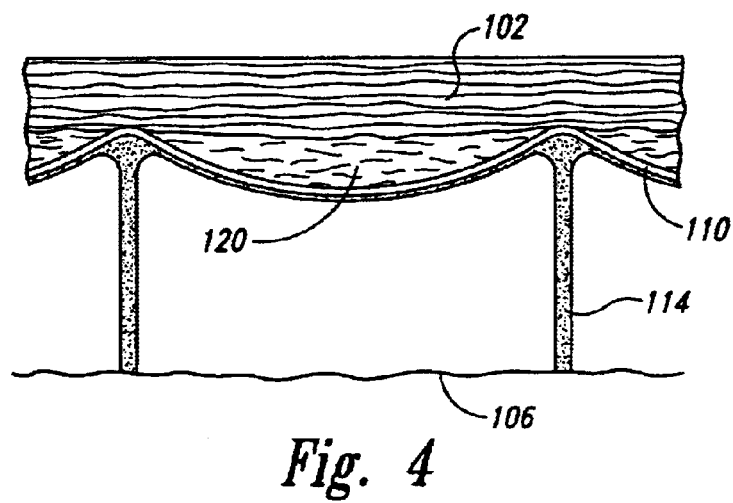
FIG. 4 is another schematic, partial sectional view showing sandwich structure with resin depletion in the skin, but where the resin is prevented from reaching the core with a bulging, unsupported barrier film.

FIG. 4 illustrates undesirable bulging that can occur if a barrier film 110 is used without a scrim-supported film adhesive 112 to try to eliminate cell resin 118. Here, a waste resin bulge 120 protrudes downwardly into the cells 114 of the honeycomb core 106. While the resin is contained in the bulge 120, the skin 102 is still depleted in resin. The flow of resin to bulge 120 imposes structural performance and weight penalties comparable to the uncontrolled condition illustrated in FIG. 3.

Figure 2:
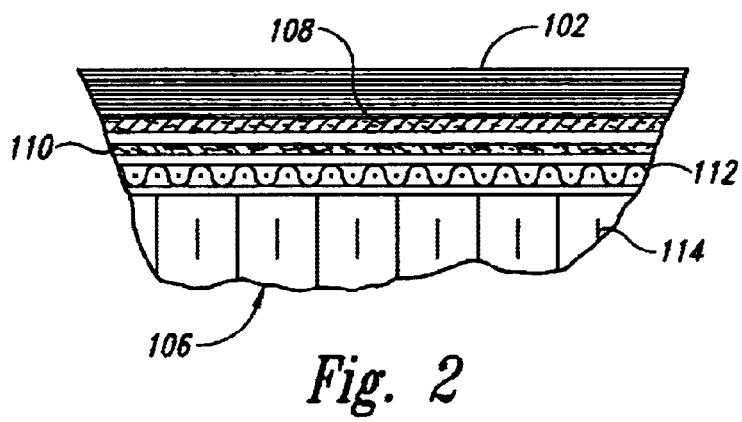
FIG. 2 is a schematic, partial sectional view of the skin-core interface in Hartz-type sandwich structure having a scrim-supported barrier film to prevent resin flow from the skin to the core.

As shown in FIG. 2 with the film adhesive 108, barrier film 110, and scrim-supported film adhesive 12, resin flow is checked without cell resin 118 or resin bulges 120. We discovered, however, that the barrier film produced a slip plane between the laminate skins and the core which often resulted in core crush during the autoclave processing cycle. In 22 of 31 test panels, in fact, Hartz et al. experienced core crush in their initial trials. This rate of failure is unacceptable from a cost and schedule perspective. Our tiedown plys in the chamfer region reduce the frequency of or eliminate damaging core slippage and the core crush attributable to such slippage.

For bismaleimide laminated skins made with RIGIDITE® 5250-4-W-IM7-GP-CSW, RIGIDITE® 5250-4-W-IM7-GP-CSX, and RIGIDITE® 5250-4-WIM7-GP-PW prepreg from Cytec Engineered Materials, Inc. (Cytec), the film adhesive 108 preferably is 0.015 psf METLBOND® 2550U adhesive, also available from Cytec. The film adhesive provides additional resin to promote a quality bond between the laminate and barrier film 110. The barrier film 110 preferably is a 0.001 inch thick, bondable grade, surface treated KAPTON® polyimide barrier film capable of withstanding the cure cycle to provide a resin impermeable membrane between the skin 102 and core 106. The scrim preferably is fiberglass, "Style 104" fiber cloth and the film adhesive 112 is 0.06 psf METLBOND® 2550G adhesive, available from Cytec. The scrim-supported film adhesive prevents the barrier film from bulging into the core cells, thereby retaining the resin in the laminate (i.e., skin layers) so that the cured ply thickness is maximized and thereby, we achieve maximum performance at minimum weight for the panels.

The film adhesive 108, barrier film 110, and film adhesive 112 can be purchased as a single item from Cytec as METLBOND® 2550B-0.082 36".

The plys of the skin 102 typically are prepregs of carbon fiber impregnated with bismaleimide thermoset resin, although the present invention applies to other resin systems. Tows might be used in place of the prepreg. The film adhesive 108 should be tailored to achieve an adequate bond between the skin 102 and barrier film 110. The honeycomb core generally is HRP Fiberglass Reinforced Phenolic honeycomb available from Hexcel.

The supported film adhesive and barrier film layers in the sandwich structure also function as corrosion barriers between the skin 102 and core 106 in the case where the core is metal, such as aluminum, and the skin includes a galvanically dissinilar material, such as carbon fiber.

Additional information concerning preferred panels is presented in the technical paper: Hartz et al., "*Development of a Bismaleimade/Carbon Honeycomb Sandwich Structure*," SAMPE, March, 1996, which we incorporate by reference. This paper describes both the barrier film improvement and the tiedown ply method of the present invention.

The Hartz-type panels provide mechanical and physical edgeband properties equivalent to solid BNI/carbon laminate (cured at 0.59 MPa (85 psig)). Our tests confirm that in our panels the edgeband cured-ply-thickness is equivalent to a solid laminate and that the edgeband 160 (FIGS. 5 & 6) met the requirements of the solid laminate nondestructive inspection specification. The edgeband and facesheet mechanical performance improved over results we achieved with sandwich structure lacking the scrim-supported adhesive, barrier film, adhesive combination. The flatwise tensile mechanical performance also met design requirements.

Preconditioning the core to eliminate volatile evolution during curing by heating the core to about 235° C. (455° F.), prior to laying up the sandwich panel, especially for phenolic core, eliminates core-laminate disbanding otherwise caused by outgassing from the core. The tiedown plys, in addition, provide egress channels for escape of volatiles from the core and for pressure equalization.

Having described a preferred, Hartz-type composite honeycomb sandwich panel, we will now turn to describing the improved panels of the present invention and their method of manufacture.

Figure 5:
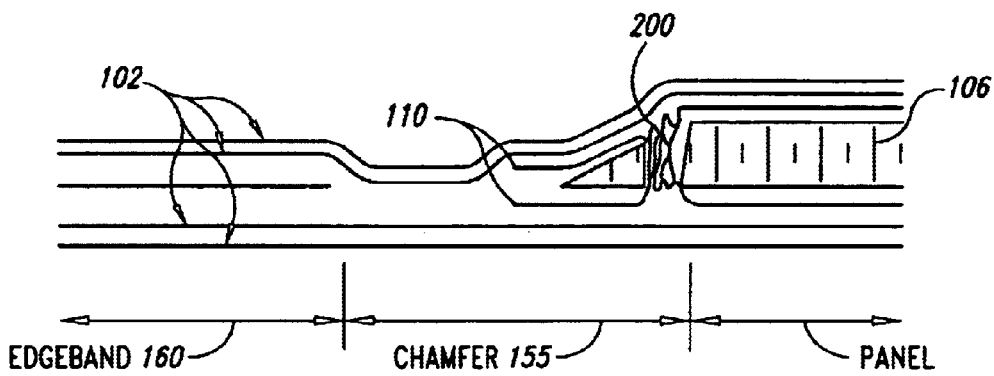
FIG. 5 is a schematic, sectional elevation showing core crush of a honeycomb sandwich panel caused by core and barrier film slippage.

Core crush 200 (FIG. 5) occurs in the chamfer region 155 when the barrier film 110 and core 106 slip relative to the facesheets 102 when autoclave pressure is applied and when the resin is melted. As shown in FIG. 5, the barrier films 100 and core 106 have moved toward the right to compress the core in the chamfer region 155 to produce the core crush 200. The skin 102 has sagged in the edgeband region 160 where the core moved away.

Figure 6:
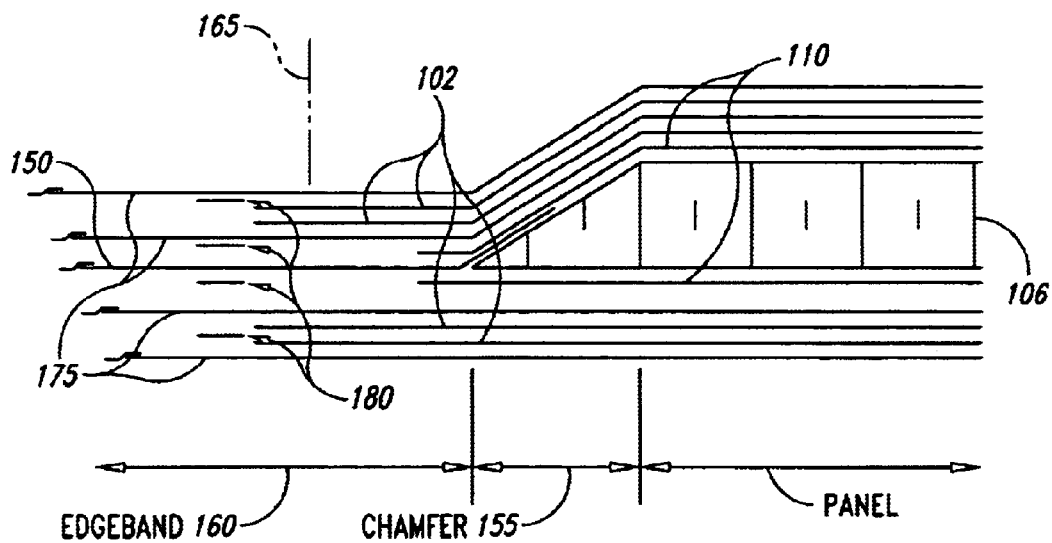
FIG. 6 is another schematic, sectional elevation showing the use of a tiedown ply to reduce core crush.

Referring now to FIG. 6, our improved honeycomb sandwich panel includes at least one tiedown ply 150 in contact with the core 106 along a chamfer 155. Such a chamfer (i.e. an angled transition in the core, often at the edgeband 160) typically occurs around the periphery of the panel, but it might also occur of the panel at join lines or hardpoints where fasteners or pass-throughs might be necessary in the assembled structure.

Typically we use a single ply 150 of carbon fiber or fiberglass fabric with a conventional 0/90 fiber orientation in the fabrication of bismaleimide panels having 5 or 8 lb/ft$^3$ HRP core, like Hartz et al. describe. The tiedown ply 150 functions to prohibit or to limit slippage of the skin relative to the core so as to reduce core crush otherwise attributable to the slippage. The tiedown ply 150 anchors the core with the inherent roughness of the fabric when the preform is heated during the autoclave processing cycle and the matrix resin softens, melts, and, for high flow resins, essentially liquefies. With these panels, we can save between 2.5–4 lb/ft$^3$ of core because we can use lighter density honeycomb core without suffering core crush. For a fighter, this change can save as much as 25 lbs per vehicle.

As shown in FIG. 6, the tiedown ply 150 is a narrow, peripheral strip that contacts the core 106 along at least a portion of the chamfer 155 for about 1 inch overlap with the core 106 and extends outward into the edgeband 160 beyond the trirnline 165 of the part. The tiedown ply 150 might be on either the flat side of the chamfer or the angled surface (which is how we show it in FIG. 6). The key factor is that the tiedown ply 150 contact the core beneath the adhesive and barrier film 110 which is used to bond the laminate skin to the core. The tiedown ply 150 is cutaway everywhere in the body of the part other than a narrow peripheral area in the chamfer region, and forms a peripheral frame around the edge of the panel. In this way, the tiedown ply 150 allows an adhesive interface between the core 106 and the skins 102 in the panel region.

Traditionally, we use four complete cover sheet tiedown plies 175 in an effort to anchor the layers and the core, and we show all these plies in FIG. 6. These traditional plies 175 were commonly used in sandwich panel fabrication prior to introducing the Hartz-type barrier film, and we commonly use them all, although we believe we can now eliminate all but the outer plies and the peripheral, core contacting tiedown ply 150. That is, we would use three total plies rather than five, as FIG. 6 shows.

The tiedown plies 150 and 175 extend through the edgeband 160 beyond the net trim line 165 to anchoring points that we tape to the layup mandrel. To further prevent slippage of the tiedown plies, we have incorporated a low curing (i.e. 121° C. for BMI panels) film adhesive 180 between the tiedown plies just outside the net trim line of the part. The film adhesive 180 eliminates movement of one ply relative to the others when we apply pressure during the autoclave curing cycle.

Thus, the tiedown method of the present invention can save material, reduce cost, and save weight, if only the "picture frame" peripheral tiedown ply 150 is used (with the traditional, internal sheets omitted). The normal tiedown procedure entails plys on the outer surfaces of the skins and internally between the skin and underlying adhesive. This tiedown system fails without the "picture frame" ply because the barrier film 110 permits the core to slip.

For lightweight core (i.e. 5–8 lb/ft$^3$) with the bismaleimide prepreg and adhesive system previously described, we hold the chamfer angle to 20°±2°.

By "chamfer" we mean an angled, cut region of the honeycomb core tapering from full thickness to no thickness with a steady slope. A chamfer is used at the edge band of a composite honeycomb sandwich panel to provide a smooth transition between the structural body of the panel that has the embedded honeycomb and a connecting edge band lacking any honeycomb core. The method of the present invention allows us to use much steeper chamfer angles than traditional practices often require if one is to avoid core crush without one tiedown ply. While we prefer a 20° chamfer, we believe that we could increase the angle to whatever angle suited the panel design requirements.

By "autoclave processing" we mean the cycle of elevated temperature and pressure applied to the panel to consolidate and cure resin in the laminate while bonding or otherwise adhering the cured laminate to the honeycomb core.

If core crush occurs, the damage to the panel is generally so extensive that repair is impossible so the part is scraped. The cost of today's advanced composite resins and reinforcing fibers requires a process that virtually eliminates core crush. Otherwise, the processing costs are prohibitive. With panels being designed as close to the design edge as possible, core crush is a significant issue. The method of the present invention solves cores crush concerns at the root cause.

While we have described preferred embodiments, those skilled in the art will readily recognize alterations, variations, and modifications, which might be made without departing from the inventive concept. Therefore, interpret the claims liberally with the support of the full range of equivalents known to those of ordinary skill based upon this description. The examples are given to illustrate the invention and are not intended to limit it. Accordingly, define the invention by the claims and limit the claims only as necessary in view of the pertinent prior art.

We claim:

1. A method for reducing core crush during manufacture of a chamfered composite honeycomb sandwich panel having a laminate face sheet adhered to a honeycomb core, the core having a chamfer, comprising the step of:

contacting a carbon or fiberglass fabric tiedown ply with the honeycomb core of the panel in the region of the chamfer to prevent slippage between the core and the laminate face sheet.

2. The method of claim 1 herein the laminate face sheet includes a barrier film to prevent resin flow from the laminate face sheet into cells of the core.

3. A method to provide egress channels for escape of volatiles from a honeycomb core during autoclave curing of a composite sandwich panel containing the core, comprising the steps of:

positioning a carbon or fiberglass fabric tiedown ply in contact with the core between the core and a laminate adhered over the core, the ply allowing volatiles to escape from the core and equalizing the pressure between the core and an autoclave during cure of the panel.

* * * * *